(12) United States Patent
Ackerly et al.

(10) Patent No.: US 12,732,487 B2
(45) Date of Patent: *Sep. 8, 2026

(54) METHODS AND SYSTEMS FOR SECURING CONTAINERIZED APPLICATIONS

(71) Applicant: Virtru Corporation, Washington, DC (US)

(72) Inventors: William Rodgers Ackerly, Washington, DC (US); Julian Embry Herwitz, Arlington, VA (US); Timothy Robert Tschampel, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,775

(22) Filed: Apr. 7, 2024

(65) Prior Publication Data

US 2024/0250937 A1 Jul. 25, 2024

Related U.S. Application Data

(63) Continuation of application No. 17/184,364, filed on Feb. 24, 2021, now Pat. No. 11,991,155.

(Continued)

(51) Int. Cl.

| | |
|---|---|
| ***H04L 9/40*** | (2022.01) |
| ***H04L 9/08*** | (2006.01) |

(Continued)

(52) U.S. Cl.

CPC .......... *H04L 63/0428* (2013.01); *H04L 9/085* (2013.01); *H04L 9/3268* (2013.01); *H04L 63/10* (2013.01); *H04L 67/60* (2022.05)

(58) Field of Classification Search

None

See application file for complete search history.

(56) References Cited

U.S. PATENT DOCUMENTS

| | | | | |
|---|---|---|---|---|
| 9,680,872 | B1 * | 6/2017 | Roth | G06F 21/44 |
| 2014/0108793 | A1 | 4/2014 | Barton | |

(Continued)

FOREIGN PATENT DOCUMENTS

| | | |
|---|---|---|
| WO | 0244850 | 6/2002 |

OTHER PUBLICATIONS

Extended European Search Report issued in App. No. EP21760786, dated Jan. 26, 2024, 11 pages.

(Continued)

*Primary Examiner* — Brandon Hoffman

(74) *Attorney, Agent, or Firm* — Blueshift IP, LLC; Cynthia M. Gilbert

(57) ABSTRACT

A method for securing data access by containerized applications includes intercepting, by a first container executing on a first computing device and associated with a containerized application in a second container executing on the first computing device, a first Internet Protocol (IP) request from the containerized application. The first container determines that the IP request is addressed to a second computing device executing a resource that the containerized application is authorized to access. The first container encrypts a payload portion of the IP request and transmits, to the resource, a second IP request with the encrypted payload portion. The first container receives, from the resource, a response. The first container requests, from a third computing device, a cryptographic key for decrypting the response. The first container decrypts, with the cryptographic key, a payload portion of the response and transmits, to the containerized application, the decrypted payload portion of the response.

8 Claims, 10 Drawing Sheets

Related U.S. Application Data

(60) Provisional application No. 63/046,182, filed on Jun. 30, 2020, provisional application No. 62/982,313, filed on Feb. 27, 2020.

(51) Int. Cl.

| | |
|---|---|
| ***H04L 9/32*** | (2006.01) |
| ***H04L 67/60*** | (2022.01) |

(56) References Cited

U.S. PATENT DOCUMENTS

| | | | | |
|---|---|---|---|---|
| 2015/0317490 | A1 | 11/2015 | Carey | |
| 2017/0093923 | A1 | 3/2017 | Duan | |
| 2018/0013729 | A1* | 1/2018 | Cooper | H04L 63/0428 |
| 2019/0155728 | A1 | 5/2019 | Ferguson | |
| 2019/0372766 | A1 | 12/2019 | Bahrenburg | |
| 2021/0281548 | A1 | 9/2021 | Ackerly | |

OTHER PUBLICATIONS

Notice of International Search Report & Written Opinion mailed Jun. 11, 2021, in international patent application No. PCT/US2021/019471, 7 pages.

Office Action (Final Rejection) dated May 16, 2023 for U.S. Appl. No. 17/184,364 (pp. 1-9).

Office Action (Notice of Allowance and Fees Due (PTOL-85)) dated Jan. 4, 2024 for U.S. Appl. No. 17/184,364 (pp. 1-5).

Office Action (Notice of Allowance and Fees Due (PTOL-85)) dated Apr. 18, 2024 for U.S. Appl. No. 17/184,364 (pp. 1-2).

* cited by examiner

METHODS AND SYSTEMS FOR SECURING CONTAINERIZED APPLICATIONS

CROSS-REFERENCE TO RELATED APPLICATIONS

This application is a continuation of U.S. Non-Provisional patent application Ser. No. 17/184,364, filed on Feb. 24, 2021, and issued on May 21, 2024, as U.S. Pat. No. 11,991,155, entitled "Methods and Systems for Securing Containerized Applications," which itself claims priority from U.S. Provisional Patent Application Ser. No. 62/982,313, filed on Feb. 27, 2020, entitled "Methods and Systems for Securing Containerized Applications," and from U.S. Provisional Patent Application Ser. No. 63/046,182, filed on Jun. 30, 2020, entitled "Methods and Systems for Securing Containerized Applications," each of which is hereby incorporated by reference.

BACKGROUND

The disclosure relates to methods for securing containerized applications. More particularly, the methods and systems described herein relate to functionality for securing data access by containerized applications.

Conventionally, containerized applications provided by a first entity may need to comply with one or more security policies in order to access data provided by a second entity, which typically involves modifications to the container; should the first entity attempt to allow the containerized applications to access data provided by multiple other entities, additional modifications may be required by each additional entity. There is a need for methods and systems that allow a first entity's containerized applications to access a second entity's data without modification of the containerized applications.

BRIEF DESCRIPTION

In one aspect, a method for securing data access by containerized applications includes intercepting, by a first container executing on a first computing device and associated with a containerized application in a second container executing on the first computing device, a first Internet Protocol (IP) request from the containerized application. The method includes determining, by the first container, that the IP request is addressed to a second computing device executing a resource that the containerized application is authorized to access. The method includes encrypting, by the first container, a payload portion of the IP request. The method includes transmitting, by the first container, to the resource, a second IP request with the encrypted payload portion. The method includes receiving, by the first container, from the resource, a response to the second IP request. The method includes requesting, by the first container, from a third computing device, a cryptographic key for decrypting the response to the second IP request. The method includes decrypting, by the first container, with the cryptographic key, a payload portion of the response. The method includes transmitting, by the first container, to the containerized application, the decrypted payload portion of the response.

In another aspect, a method for securing data transmission by containerized applications includes intercepting, by a first container executing on a first computing device and associated with a containerized application in a second container executing on the first computing device, a first Internet Protocol (IP) request from the containerized application, the request including a request to transmit data to a second computing device. The method includes determining, by the first container, that the containerized application is authorized to access a resource executed by the second computing device. The method includes encrypting, by the first container, a payload portion of the IP request. The method includes transmitting, by the first container, to the resource, a second IP request with the encrypted payload portion.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
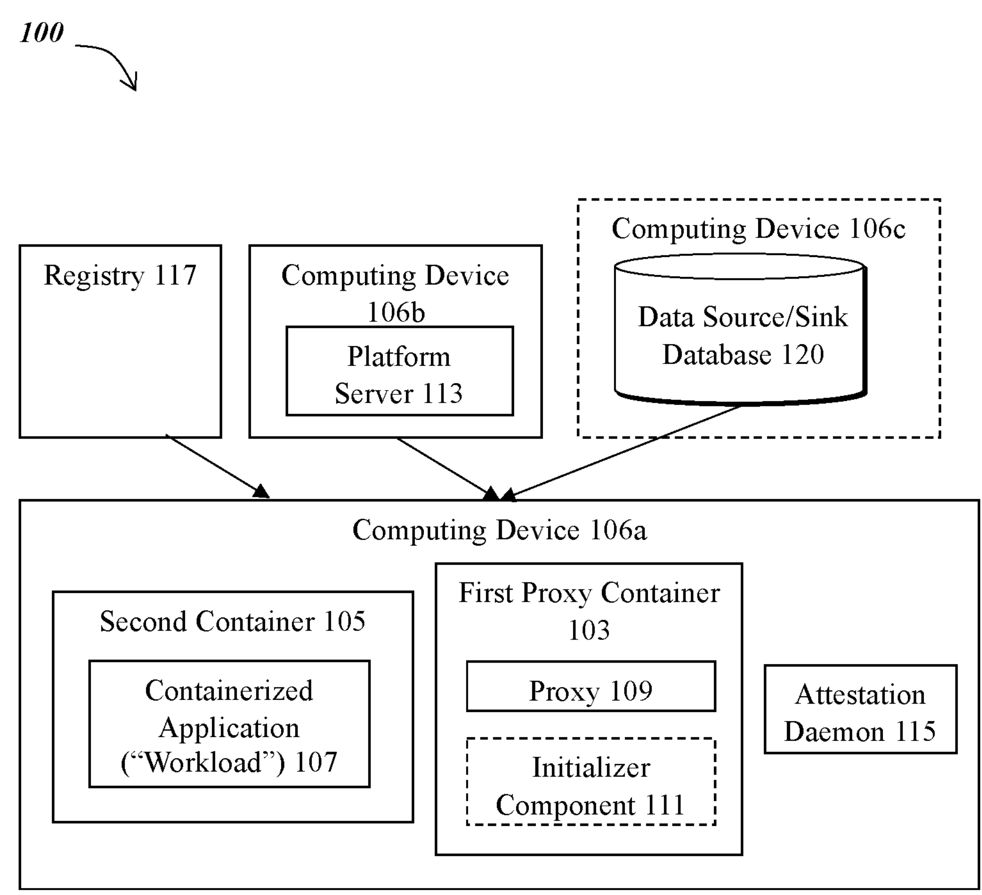
FIG. 1A is a block diagram depicting an embodiment of a system for securing containerized applications.

The methods and systems described herein may provide functionality for securing containerized applications. The methods and systems described herein may provide holistic data security for heterogeneous containerized compute workflows; a transparent proxying layer can enforce transitive access controls for data. This data-centric approach protects data outside the purview of individual services.

The methods and systems described herein may provide functionality for transparently imposing a uniform data security posture across an organization's analytics operations, enforcing data use compliance, while minimizing friction for workflows and personnel. Encryption-based access controls may limit exposure and keep data in compliance. Additional benefits may include model attribution; training data authenticity, attribution, revocation; audit trail; and derived data capabilities (e.g., transitive access controls, contract enforcement, and data provenance).

In some embodiments, a first entity may control data that the first entity (a data owner) decides to allow a second entity (or a plurality of other entities) to analyze; however, the first entity may want assurances that entities that access that data will apply one or more security policies during the course of interacting with the data, especially if sensitive data is involved. In an embodiment in which the entities that are analyzing the data do so by using a workload that is a containerized application (e.g., an application executing within a container, such as a container implemented using the KUBERNETES system developed by the Cloud Native Computing Foundation, or a virtual machine, such as a virtual machine provided by an Amazon Machine Image (AMI) developed by Amazon Web Services, Inc., (also referred to as AWS), or other similar environment), the entities analyzing the data may need to comply with one or more security policies but need a way to do so without having to modify the containerized application, especially since they may be analyzing a plurality of data sets and where the security policies may differ for each data set (e.g., a data owner may have different policies for different data sets or multiple data owners may be providing data sets and each data owner has policies that differ across data sets and across data owners). Use of the methods and systems described herein may provide functionality for satisfying one or more security policies without requiring modification of the containerized application.

The methods and systems described herein may integrate into existing applications and workflows, in which plaintext data is not disseminated (e.g., should an operation fail), and in which data owners, workload developers (e.g., developers of containerized applications), and workflow runners do not need to trust each other to interact and collaborate and where the containerized application need not be modified in order to comply with security requirements.

Data analytics have an inherent tension between data security and utility. Data engineers want the flexibility to explore and tweak models, which conflicts with residency regulations and "shift left" best practices (e.g., practices intended to find and prevent defects early in a software delivery process by moving testing earlier in the software development process). In some embodiments, the system described herein addresses this tension by transparently enforcing policy obligations and encryption/decryption needs, thereby enabling the same workflows and code to operate as the components of the system.

Referring now to FIG. 1A, a block diagram depicts one embodiment of a system for securing containerized applications. In brief overview, the system 100 includes a computing device 106*a*, a computing device 106*b*, a first proxy container 103, a second container 105, a containerized application 107, a proxy 109, a platform server 113, an attestation daemon 115, a registry 117, and a database 120. The system 100 may include an optional initializer component 111. The computing devices 106*a*-10*b* may be a modified type or form of computing device (as described in greater detail below in connection with FIGS. 4A-4C) that have been modified to execute instructions for providing the functionality described herein; these modifications result in a new type of computing device that provides a technical solution to problems rooted in computer technology, such as securing data access by containerized applications without requiring modification of the containerized application.

The first proxy container 103 may be provided as a software component. The first proxy container 103 may be provided as a hardware component. The computing device 106*a* may execute the first proxy container 103. The proxy 109 may execute within the first proxy container 103. The optional initializer component 111 may execute within the first proxy container 103. The first proxy container may be referred to as a sidecar, a sidecar proxy container, or a security sidecar. In one embodiment, the sidecar component 103 is provided as an Envoy extension, given Envoy's ubiquity and reputation as a trusted and reliable proxy layer.

In some embodiments, the system 100 includes the optional initializer component 111. The initializer component 111 may set up resources and configuration for the sidecar container. The sidecar proxy container and the initializer container may be so tightly coupled as to be considered a single component. Alternatively, the sidecar proxy container and the initializer container may be provided as separate components.

The second proxy container 105 may be provided as a software component. The second proxy container 105 may be provided as a hardware component. The computing device 106*a* may execute the second proxy container 105. The second proxy container 105 may execute the containerized application 107.

The containerized application 107 (including, e.g., an arbitrary containerized application) may be an application that performs a discrete operation on data (including on, e.g., sensitive data). The containerized application 107 may be referred to as a workload. One or more workloads may perform a sequence of operations (including, e.g., asynchronous operations) to consume and/or transform data; such a sequence of operations may be referred to as a workflow. A canonical analytic workflow could ingest, sanitize, classify, and/or act on input data, for example, and without limitation, detecting and rejecting fraudulent credit card transactions. These steps do not have to occur in the same cluster or environment—the methods and systems described herein facilitate secure workflows that can run across customer accounts or cloud providers.

The first proxy container 103 may run alongside containerized applications 107 to enforce authenticated reads and writes of protected data. The sidecar proxy container 103 may encrypt and decrypt workload data. In one embodiment, the sidecar proxy container 103 may transparently decrypt ciphertext and encrypt plaintext payloads for a verifiable containerized application to ensure sensitive data is delivered only to approved workloads and is encrypted end-to-end throughout and before/after each workflow. Both the plaintext and ciphertext may be stored and operated fully on customer infrastructure, without requiring a third-party server to receive the data, and only authentication information and wrapped key material is exchanged.

The proxy 109 may be provided as a software component. The proxy 109 may be provided as a hardware component. The proxy 109 may execute the initializer component 111. The proxy 109 may provide the functionality of the initializer component 111. The proxy 109 may be in communication with the initializer component 111. The proxy 109 may be in communication with the containerized application 107.

The computing device 106*a* may include or be in communication with the database 120. The database 120 may store data for processing by one or more containerized applications 107. The database 120 may be maintained and operated by the same entity that maintains and operates the first proxy container 103 and the containerized application 107. Alternatively, the database 120 may be maintained and operated by a different entity than the entity that maintains and operates the first proxy container 103 and the containerized application 107. The database 120 is an ODBC-compliant database. For example, the database 120 may be provided as an ORACLE database, manufactured by Oracle Corporation of Redwood Shores, CA. In other embodiments, the database 120 can be a Microsoft ACCESS database or a Microsoft SQL server database, manufactured by Microsoft Corporation of Redmond, WA. In other embodiments, the database 120 can be a SQLite database distributed by Hwaci of Charlotte, NC, or a PostgreSQL database distributed by The PostgreSQL Global Development Group. In still other embodiments, the database 120 may be a custom-designed database based on an open source database, such as the MYSQL family of freely available database products distributed by Oracle Corporation of Redwood City, CA. In other embodiments, examples of databases include, without limitation, structured storage (e.g., NoSQL-type databases and BigTable databases), HBase databases distributed by The Apache Software Foundation of Forest Hill, MD, MongoDB databases distributed by 10Gen, Inc., of New York, NY, an AWS DynamoDB distributed by Amazon Web Services and Cassandra databases distributed by The Apache Software Foundation of Forest Hill, MD. In further embodiments, the database 120 may be any form or type of database.

The system 100 may include a data store, e.g., an arbitrary blob file store. The sidecar may support request syntax for common storage services like S3 and SQS. The sidecar may also expose a plugin interface allowing users to add support for custom or private service APIs. The data store may be provided by the database 120. Alternatively, the data store may be provided by a second database 120*b* (not shown).

The platform server 113 may execute on the computing device 106*b*. The platform server 113 may be in communication with the proxy 109. The same entity that provides the proxy 109 may provide the platform server 113. The platform server 113 may provide at least one platform service that provide services the sidecar may use in encrypting and decrypting data and in accessing encryption keys.

The attestation daemon 115 may be a daemon container running on each node and providing an attestation certificate that the platform can use to authenticate both the sidecar and workload.

The registry 117 may execute on a computing device 106*c* (not shown). The registry 117 may be stored in a second database 120 (not shown). The registry 117 may be a container registry, such as a public or private registry with published and signed containers. Data owners may have access to the registry 117 and may be authorized to inspect and whitelist specific applications to access their protected data. The system 100 may provide a registry 117 that leverages one of several registry technologies in the market that support signing and integrity checks of containers, such as registry technologies provided by Docker, Inc., of Palo Alto, CA (e.g., dockerhub), or by the Cloud Native Computing Foundation (e.g., Harbor or The Update Framework (TUF) Notary). The sidecar 103 may forward the signature of its workload container when it authenticates to the platform server 113. The backend may corroborate the signature by independently checking against the container registry 117. If the signature corroboration is successful, the backend may issue an entity object (e.g., a short-lived certificate) bound to the workload identity; in some embodiments, the attestation daemon 115 may provide this functionality.

Although, for ease of discussion, the registry 117, platform server 113, database 120, containerized application 107, attestation daemon 115, and proxy 109 are described in FIG. 1A as separate modules, it should be understood that this does not restrict the architecture to a particular implementation. For instance, these components may be encompassed by a single circuit or software function or, alternatively, some or all of the components may be distributed across a plurality of computing devices. Similarly, although only a single registry 117, platform server 113, database 120, containerized application 107, attestation daemon 115, and proxy 109 is depicted in FIG. 1A, there may be multiple ones of any, all, or a subset of those components.

Figure 1B:
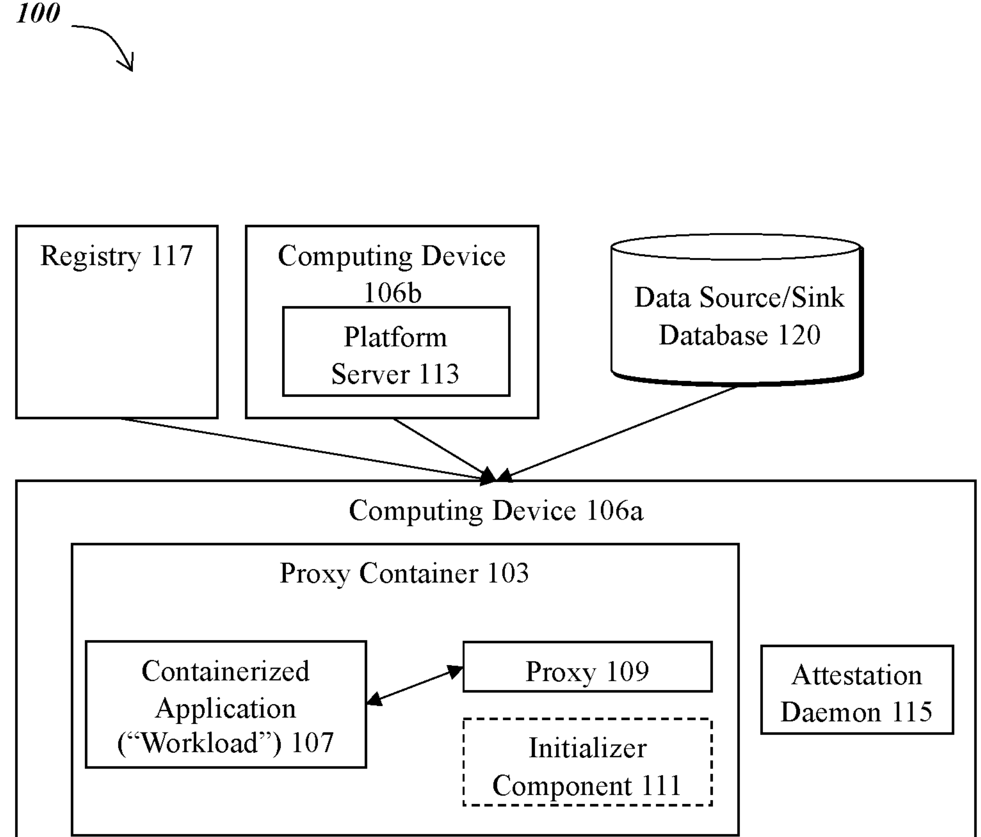
FIG. 1B is a block diagram depicting an embodiment of a system for securing containerized applications.

Referring now to FIG. 1B, in some embodiments, the containerized application 107 does not execute in a second container 105 but instead executes directly within the proxy container 103.

Figure 1C:
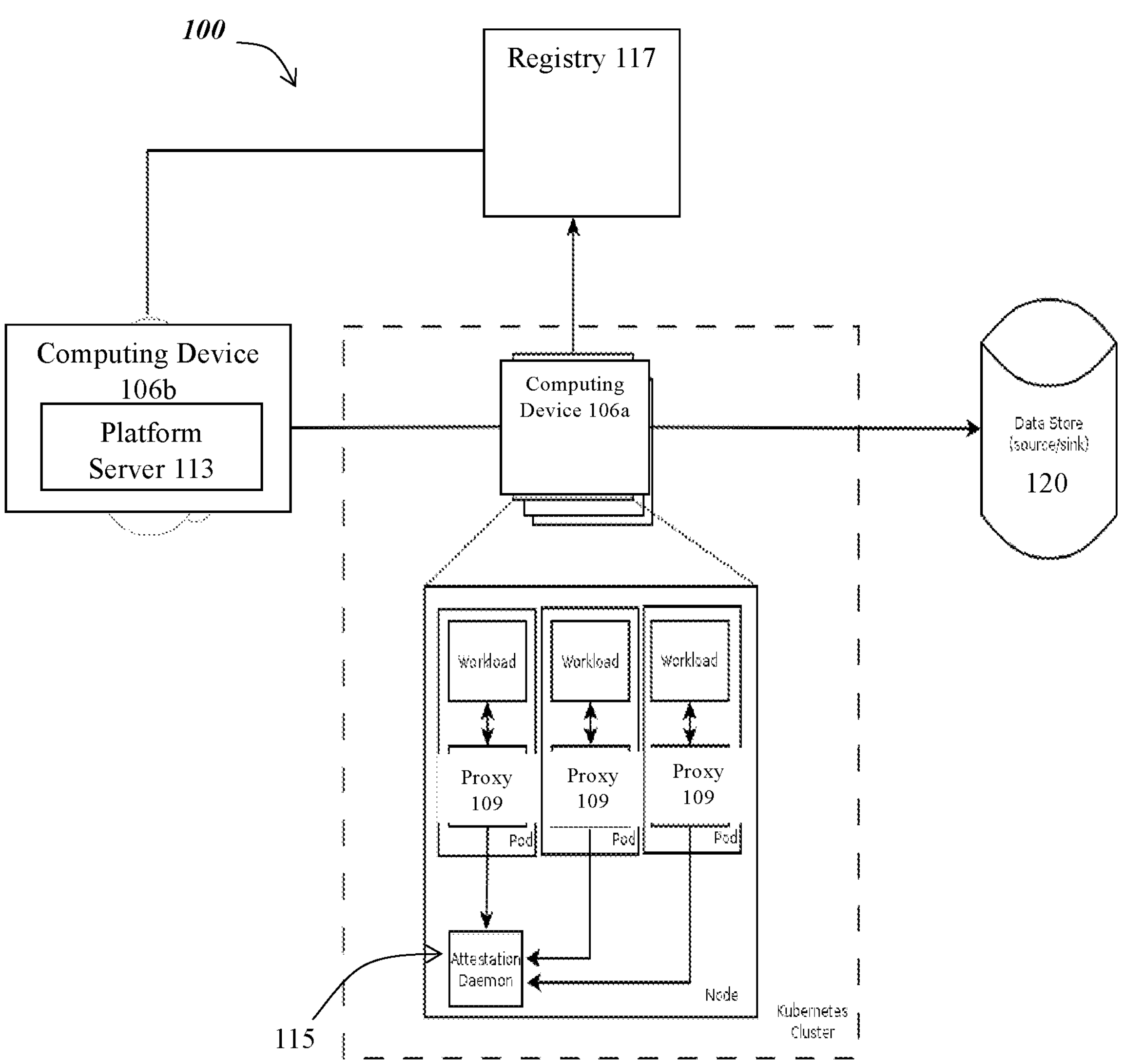
FIG. 1C is a block diagram depicting an embodiment of a system for securing containerized applications.

Referring now to FIG. 1C, in some embodiments a computing device 106*a* executes a plurality of workloads, each of which is accompanied by a separate proxy 109.

Figure 1D:
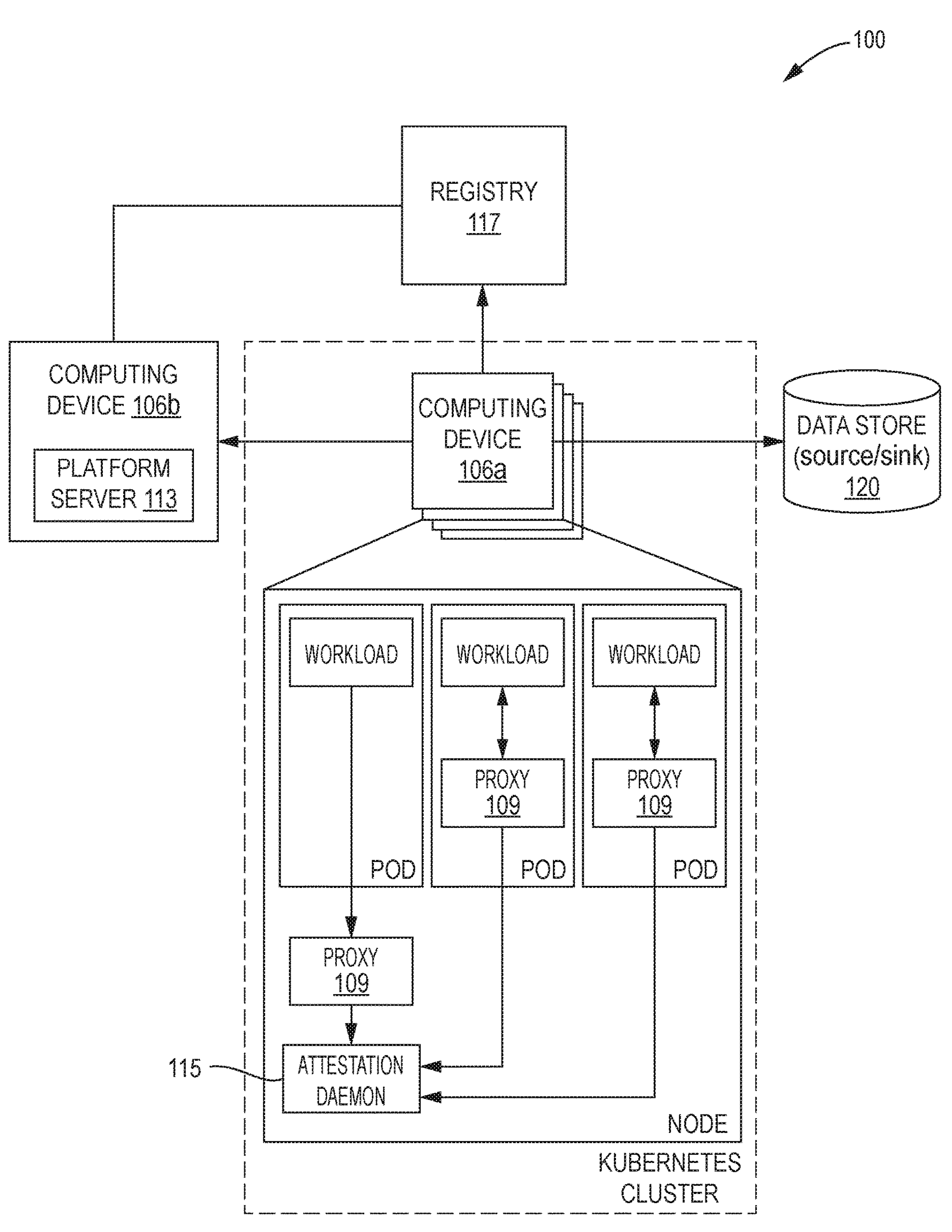
FIG. 1D is a block diagram depicting an embodiment of a system for securing containerized applications.

Referring now to FIG. 1D, in some embodiments a computing device 106*a* executes a plurality of workloads, each of which is accompanied by a separate proxy 109. As shown in FIG. 1D, at least one proxy 109 may execute within the pod in which its associated workload executes while at least one other proxy 109 executes on the same node (e.g., the same computing device 106*a*) but outside of the pod within which its associated workload executes.

Figure 1E:
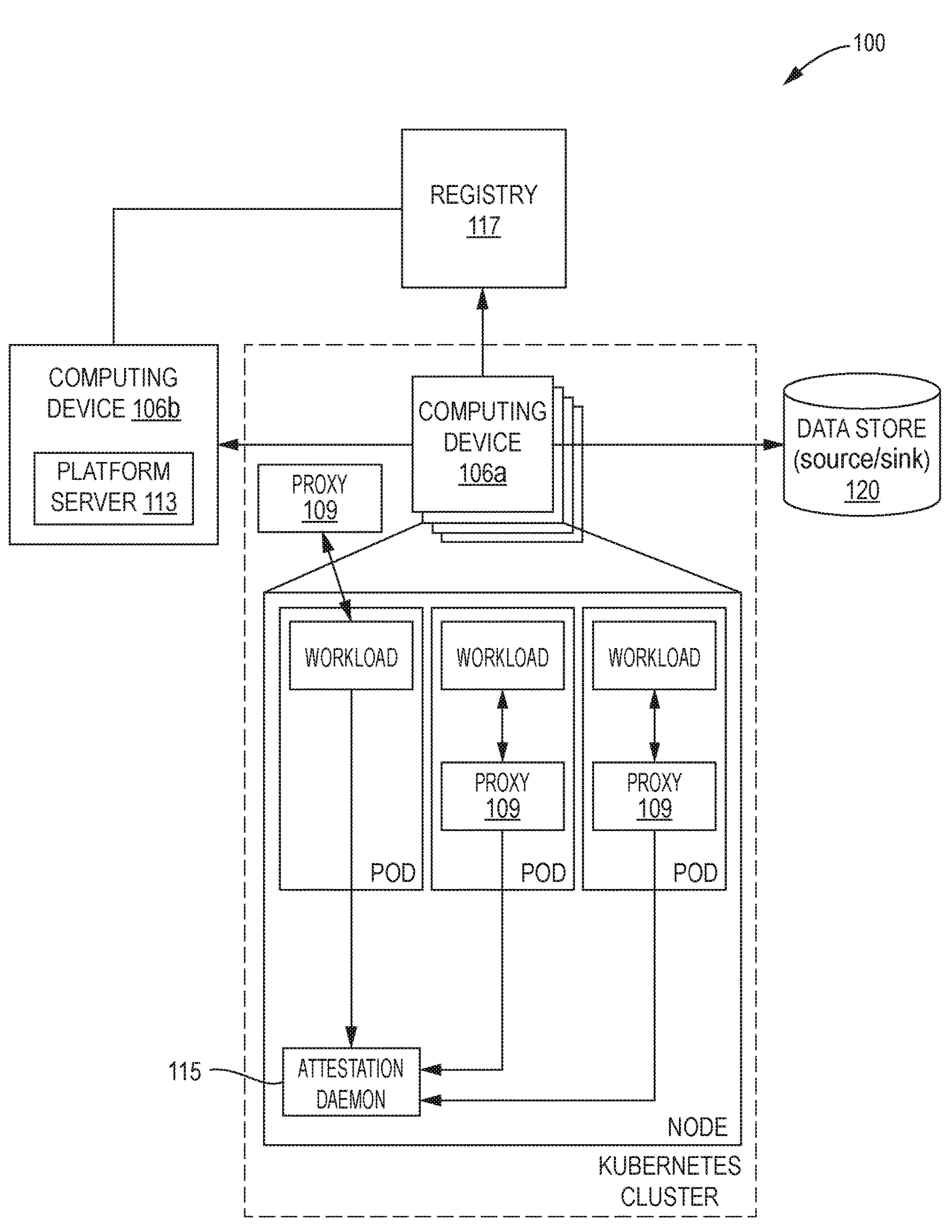
FIG. 1E is a block diagram depicting an embodiment of a system for securing containerized applications.

Referring now to FIG. 1E, in some embodiments a computing device 106*a* executes a plurality of workloads, each of which is accompanied by a separate proxy 109. As shown in FIG. 1E, at least one proxy 109 may execute within the pod in which its associated workload executes while at least one other proxy 109 executes on a different node (e.g., a second computing device 106*c*, not shown) and outside of the pod within which its associated workload executes.

In some embodiments, use of the sidecar proxy container 103 allows data analysts (e.g., users or entities that provide analytic business logic for data owner data) to continue using their existing containerized business logic without modification, and allows data owners (e.g., entities that own data to be analyzed) to strongly assert how their data will be disseminated and used. In some embodiments, the system may leverage a container validation framework (such as the Docker Content Trust framework provided by provided by Docker, Inc., of Palo Alto, CA) to strongly assert that data is decrypted only for the containers specified by data owners. Analysts can configure a filter to specify which domains data should be encrypted for (and the system can automatically detect for decrypt). For instance, the sidecar proxy container 103 could automatically decrypt TDF-encrypted patient health data fetched from S3 by a diagnosis classification container. Then, the resulting diagnosis would be automatically encrypted as it's written out for the next step in the workflow. The classification container would be wholly agnostic to how the data is secured, while still being able to operate on plaintext in a secure fashion.

As will be understood by those of ordinary skill in the art, KUBERNETES is a widely-used framework for deploying and managing containerized services and applications, and as such is a natural avenue for facilitating sidecar integration. KUBERNETES is typically agnostic to data flowing in and out of its managed containerized applications. It is left to the individual container business logic to fetch or push data securely and appropriately. In one embodiment, the sidecar proxy container 103 described herein executes alongside the workload application in the same pod within the KUBERNETES architecture. The sidecar proxy container 103 can then exchange wrapped key material with the platform server 113, which authenticates both the sidecar 103 and the workload to enforce data (key) access controls.

In some embodiments, the methods and systems described herein provide functionality for federating existing identity solutions to strongly enforce policy on data for any and all steps of a distributed workflow. For instance, the SPIRE framework exposes a plugin interface for node attestation which the methods and systems described herein could leverage. As another example, the methods and systems herein may include or a first-party identity solution.

By integrating the methods and systems described herein with a KUBERNETES architecture or with a DOCKER swarm (e.g., leveraging technologies provided by Docker, Inc., of Palo Alto, CA) may allow data owners to secure their data throughout a heterogeneous container-based workflow with minimal operational overhead.

Establishing a strong identity for containerized workload applications will let the system 100 impose access controls at the container level. For instance, a hospital may encrypt patient data restricting access to audited diagnosis workloads. The platform server and sidecar would use the authenticated container identity to ensure that plaintext patient data is delivered to only the containers specified.

Figure 2:
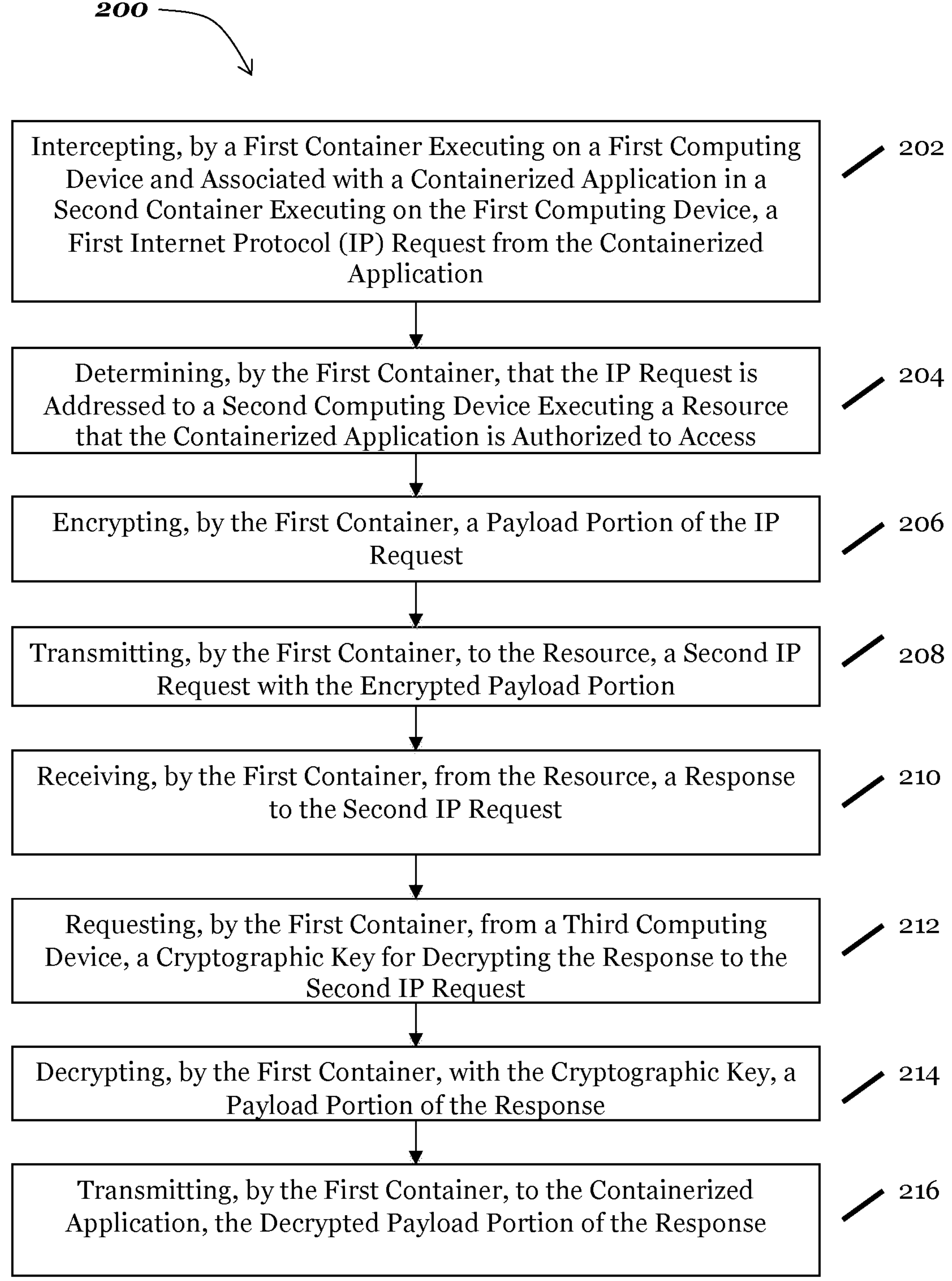
FIG. 2 is a flow diagram depicting an embodiment of a method for securing containerized applications.

Referring now to FIG. 2, in brief overview, a block diagram depicts one embodiment of a method 200 for securing data access by containerized applications, the method 200 including intercepting, by a first container executing on a first computing device and associated with a containerized application in a second container executing on the first computing device, a first Internet Protocol (IP) request from the containerized application (202). The method 200 includes determining, by the first container, that the IP request is addressed to a second computing device executing a resource that the containerized application is authorized to access (204). The method 200 includes encrypting, by the first container, a payload portion of the IP request (206). The method 200 includes transmitting, by the first container, to the resource, a second IP request with the encrypted payload portion (208). The method 200 includes receiving, by the first container, from the resource, a response to the second IP request (210). The method 200 includes requesting, by the first container, from a third computer, a cryptographic key for decrypting the response to the second IP request (212). The method 200 includes decrypting, by the first container, with the cryptographic key, a payload portion of the response (214). The method 200 includes transmitting, by the first container, to the containerized application, the decrypted payload portion of the response (216).

Referring now to FIG. 2, in greater detail and in connection with FIG. 1, the method 200 includes intercepting, by a first container executing on a first computing device and associated with a containerized application in a second container executing on the first computing device, a first Internet Protocol (IP) request from the containerized application (202). The containerized application 107 may send a standard Hypertext Transfer Protocol (HTTP) request to fetch data. The proxy 109 within the first container 103 may intercept the first IP request. Although described herein as an action executed by the first container 103 at (202), the first container 103 and the proxy 109 within the first container 103 may be described together as a "pod", which may be described as taking the actions of the first container at (202) and throughout the method 200.

The method 200 includes determining, by the first container, that the IP request is addressed to a second computing device executing a resource that the containerized application is authorized to access (204). The second computing device may be a device providing access to the database 120. The IP request may be a request directly to the database 120 instead of to an intermediary second computing device. The method 200 may include receiving, by the first container 103, a first signature associated with the containerized application 107; accessing, by the first container 103, a registry of containerized applications, the registry including a second signature for the containerized application; determining, by the first container, whether the first signature and the second signature satisfy a threshold level of similarity; and attesting, by the first container, to the resource, a level of validity of the containerized application making the first IP request.

The method 200 includes encrypting, by the first container, a payload portion of the IP request (206). The sidecar 103 may apply a policy specifying whether and how to encrypt the payload portion of the IP request; the policy may be specified by the sidecar 103, or the platform server 113, or both.

The method 200 includes transmitting, by the first container, to the resource, a second IP request with the encrypted payload portion (208). The resource receiving the second IP request believes the second IP request is from the sidecar 103 and sends responses to the sidecar 103, which the sidecar may then decrypt and forward to the containerized application once the sidecar 103 retrieves decryption keys from the platform server 113.

The method 200 includes receiving, by the first container, from the resource, a response to the second IP request (210). The response may include, by way of example, a response to a request to receive access to data (including, without limitation, a request to read, write, modify, and/or delete data).

The method 200 includes requesting, by the first container, from a third computing device, a cryptographic key for decrypting the response to the second IP request (212). The first container 103 may provide an attestation certificate to the third computing device with the request for the cryptographic key. The first container 103 may provide a shared secret to the third computing device with the request for the cryptographic key. The third computing device may be the computing device 106*b* providing access to the platform server 113.

In order to strongly assert workload identity, the method 200 may include establishing trust of the sidecar itself. There may be several methods by which the system 100 can accomplish this, and an ensemble approach combining them may effectively exercise defense-in-depth principles. These methods will in general produce an attestation certificate which the platform server 113 can use to authenticate the sidecar 103 and its underlying node. The platform server 113 can verify the sidecar 103's own container signature against the published version in the same way workload identity would be established.

The Secure Production Identity Framework For Everyone (SPIFFE) is an attestation framework used to establish infrastructure trust for KUBERNETES clusters; implementations of SPIFFE include SPIFFE Runtime Environment (SPIRE) and istio. With direct integration with ENVOY, SPIFFE may be used to establish trust for the sidecar. SPIFFE may provide the functionality of a certificate authority, which authenticates cluster resources, defining a namespaced certificate (e.g., a Secure and Verifiable Identification or "SVID") that acts as a strong resource identity. SPIRE, for instance, has an in-cluster service (e.g., a spire-server) that may validate the integrity of resources in the cluster; SPIRE may also provide SVIDs reflecting this validation. A node-local daemon service (spire-agent) may act as the client to this service on behalf of pods, which can contact it over a domain socket, similar to having the spire-agent implement the role of attestation daemon. In some embodiments, however, the platform server 113, is not configured to trust SVIDs without provenance; therefore, in some embodiments, the platform server 113 runs its own SPIFFE implementation, which allows the platform server 113 to independently trust and verify SVIDs. This SPIFFE implementation may be executed independent of the cluster (i.e., SaaS). This SPIFFE implementation may leverage any or all of the above methods for remote attestation.

In some embodiments, the system may enforce access controls contextually based on a characteristic of an authenticated user running the workflow. For instance, a patient can be agnostic to workflow specifics and may instead prefer to grant access to users from a specific hospital or subgroup within (e.g., oncology). The system can derive these identities by federating common user authentication schemes such as, without limitation, schemed incorporating the Kerberos protocol, technology such as Microsoft ACTIVE DIRECTORY provided by Microsoft Corporation of Redmond Washington, or technology such as ONELOGIN IAM authentication provided by OneLogin, Inc., of San Francisco, CA. The method 200 may allow for formulation of the access controls that data owners can use. Initially, the system 100 may provide control using policy language already available in a software development kit. Data owners can restrict access to specific workload versions or trusted distribution groups. For example, in a hospital diagnosis use-case, data owners could add an identifier such as, without limitation, "docker.io/hhs/diagnosis-app:3.1" to a policy to enable that application's data access. Access-based access control policies can simplify policy creation as they can decouple the intent of the policy from the specific entities allowed access. For instance, a data owner can create a policy with attributes "PII" and "Sinai/OR", which indicates the data contains personally-identifiable information and is allowed to be accessed by the Mount Sinai operating room group. The "Sinai/OR" attribute would include the pointer to the diagnostic distribution group, granting access to the relevant workloads if compatible with "PII."

In one embodiment, a policy feature provides the ability for customers to specify ownership and access control (attribute) changes as data is operated on by workloads. For instance, the original data policy can specify that if an "anonymizing" attribute exists on the diagnosis workload then the "PII" attribute would be dropped. Or if an experimental model transforms anonymized patient data into a form suitable for research, the "Sinai/Clinical Research Group" attribute could be added. This transformation would create a derived data policy, which would generally allow the permissions changes entailed by a workflow to be codified as a necessary sequence of access control conditions and changes.

The workload applications themselves are also able to specify access controls, since in many ways the workload developers are in the best position to know the minimal permissions set required for their app. For instance, an app developer may want to blacklist a corrupted dataset or an abusive customer. These developers can optionally include system-specific configuration in their container image or registry metadata to indicate access controls the sidecar should impose. The sidecar 103 may enforce the union of the data and workload policies, facilitating a zero-trust model.

The method 200 includes decrypting, by the first container, with the cryptographic key, a payload portion of the response (214). The method 200 includes transmitting, by the first container, to the containerized application, the decrypted payload portion of the response (216).

Figure 3:
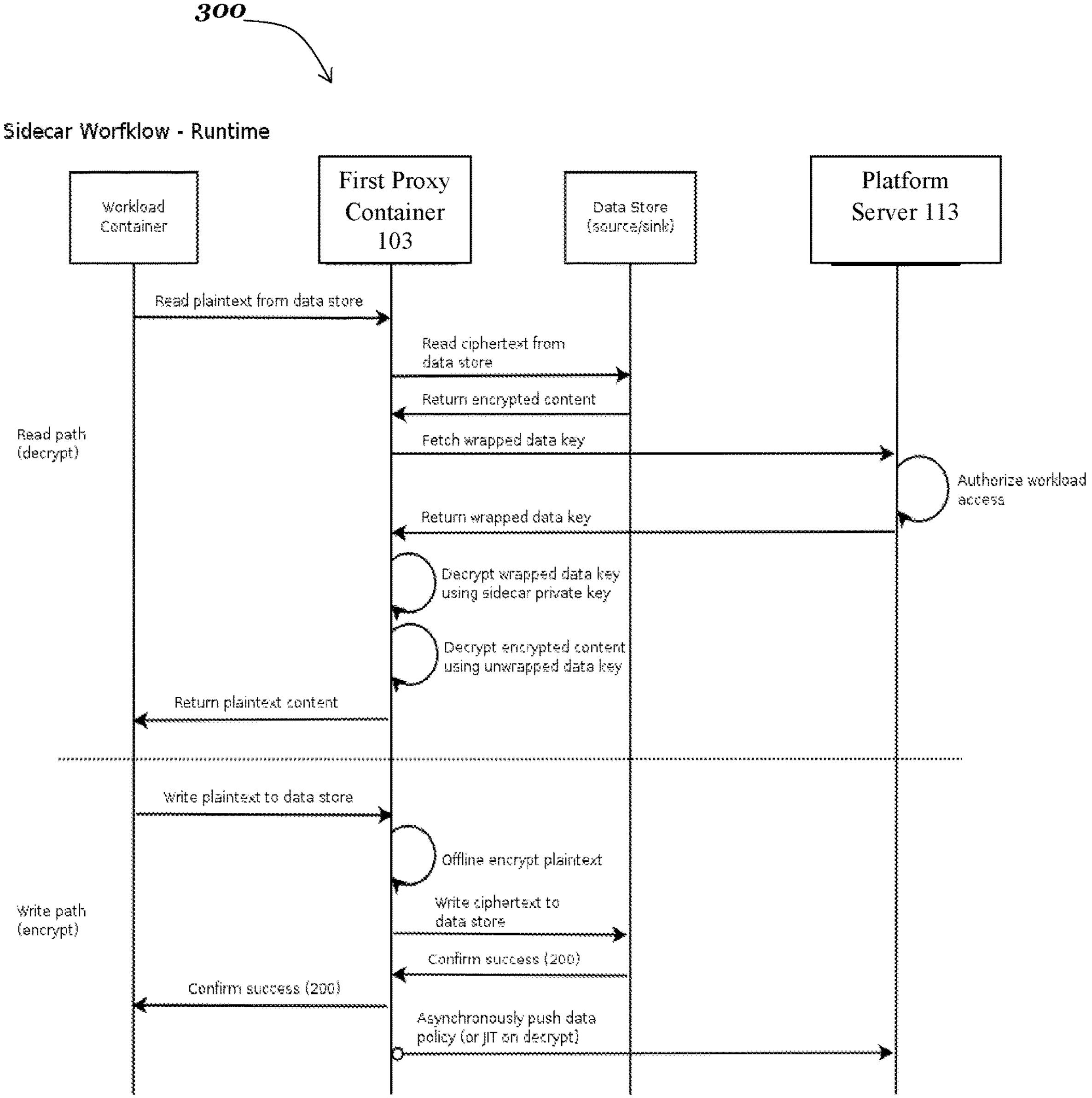
FIG. 3 is a flow diagram depicting an embodiment of a method for securing containerized applications.

Although described above in the context of intercepting requests to retrieve data, in some embodiments, a method for securing data access by containerized applications may secure data access when the containerized application is pushing data out to other computing devices, and not just when the containerized applications request data from other computing devices. Referring now to FIG. 3, a flow diagram depicts a method for securing data access by containerized applications, which includes both the steps described in connection with FIG. 2 and the steps taken when the containerized application is pushing data out to other computing devices. The method 300 for securing data access by containerized applications may include the steps described above in connection with FIG. 2. The method 300 may further include intercepting, by a first container executing on a first computing device and associated with a containerized application in a second container executing on the first computing device, a first Internet Protocol (IP) request from the containerized application, the request including a request to transmit data (e.g., a "push"); for example, the request may be a request to write plaintext to a data store 120. The method includes determining, by the first container, that the IP request is addressed to a second computing device executing a resource that the containerized application is authorized to access. The method includes encrypting, by the first container, a payload portion of the IP request. The method includes transmitting, by the first container, to the resource, a second IP request with the encrypted payload portion (e.g., writing the ciphertext to the data store).

As another example, the method 300 for securing data transmission by containerized applications may include intercepting, by a first container executing on a first computing device and associated with a containerized application in a second container executing on the first computing device, a first Internet Protocol (IP) request from the containerized application, the request including a request to transmit data to a second computing device; determining, by the first container, that the containerized application is authorized to access a resource executed by the second computing device; encrypting, by the first container, a payload portion of the IP request; and transmitting, by the first container, to the resource, a second IP request with the encrypted payload portion.

As an example of one embodiment of the methods described herein, an HTTP request may be a request to access a data set (including, e.g., sensitive data protected by the at least one security policy; the data set may be maintained by a data owner and associated with at least one security policy. The method may include receiving, by the sidecar 103, a first signature associated with the containerized application; accessing, by the sidecar 103, a registry 117 of containerized applications, which includes a second signature for the containerized application; and determining, by the sidecar 103, whether the first signature and the second signature satisfy a threshold level of similarity; the sidecar 103 may then attest to the validity of the containerized application 107 making the first HTTP request. The sidecar 103 may also attest to other attributes of the containerized application 107. The method may include safeguarding data that the containerized application 107 attempts to transmit to another entity as well as requests for data to be received by the containerized application. For example, the data owner for the data set may have associated a derived data policy to a data set that indicates that should an entity accessing the data set (e.g., the containerized application 107) generate a second data set based on that data set, one or more security policies should apply to the generated second data set (e.g., the containerized application 107 receives a first data set, applies one or more functions to the data, generates output forming a second data set, and attempts to send the second data set to another entity; the sidecar 103 may ensure that the second data set is protected by certain security policies when the second data set leaves the containerized application 107 for any destination).

The methods and systems described herein may operate in a touchless infrastructure, which may be infrastructure that cannot be modified at runtime. For instance, a touchless server would have login disabled to prevent mutation. An approach that uses touchless infrastructure may provide immutable infrastructure and improved operational reliability and security.

In some embodiments, the methods and systems described herein may include a machine image proxy, similar to the proxy container, but exposed as a touchless virtual machine (e.g., without limitation an AMI) instead of as a container. Analytic workflows may allow a machine image to be dropped right in, simplifying adoption for certain customers.

Both MICROSOFT AZURE's and GOOGLE CLOUD's managed Kubernetes services have virtual machine image marketplaces, and self-managed clusters running on these clouds would have a path to access and run nodes. For a node-AMI approach, the system 100 may leverage the Amazon Web Services (AWS) instance identity document to authenticate a touchless node. This document would be sent in accordance with the transport layer security (TLS) protocol to the system backend (e.g., the platform server 113), which would confirm the listed AMI is one published and trusted by the system. The backend (e.g., the platform server 113) may verify the document's signature against the public AWS signing certificate to ensure its authenticity and integrity.

In one embodiment, including (or "baking") a shared secret into the node AMI or sidecar container may be sufficient to authenticate the sidecar. This secret may take the form of a token that the platform server has stored internally or of a signing key that the attestation daemon uses to generate its certificates. For the AMI packaging case, including and protecting the secret may include having the AMI enforce touchless operation (e.g., disable login); the secret can be written at build-time to a privileged location inaccessible to pods.

In one embodiment, the method 200 may include publishing the sidecar and attestation daemon container images to be included in the cluster via a helper script that calls into the standard Kubernetes control plane application programming interface (API). The sidecar proxy may be automatically injected into each pod with an admission webhook. The attestation daemon may be included on each node as a daemonset pod. In such an embodiment, the method 200 may include publishing sidecar and attestation daemon container images to a trusted container registry; a workflow runner may run a helper script to set up admission webhook and daemonset; at least one pod running on at least one node may contain the sidecar and be eligible to read and write encrypted data. This approach may be modeled after those used by popular Kubernetes service meshes, including istio, linkerd, and gloo. Depending on the service mesh implementation the system 100 may be able to directly integrate with existing frameworks to significantly reduce adoption overhead.

In another embodiment, the system publishes an audited, touchless node AMI for customers to use in an AMAZON Elastic Kubernetes Service (EKS) or other self-managed cluster (e.g., via eksctl). This has the benefit of hardening the product's security posture (e.g., virtual machine barrier instead of container barrier, immutable infrastructure, etc.), as well as leveraging a business model baked into the AMI marketplace. In such an embodiment, the method 200 may include publishing a custom node AMI on the AWS marketplace; a workflow runner may configure an EKS or self-managed cluster to use this AMI; at least one pod running on at least one node may contain the sidecar and be eligible to read and write encrypted data. In such an embodiment, new nodes may automatically include the sidecar via kubelet modifications. The AMI may be built and published using an automated build pipeline which, for instance, builds EKS-ready nodes using the AWS packer scripts. This pipeline would consume upstream updates (e.g., security fixes) with standard methods and cadences, and would publish to the AWS marketplace as the production terminus.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIG. 2.

Example use cases of the methods and systems described herein include analytics, build workflows, log collection and analysis, fraud detection, and multi-cloud data access control. As an example, in an analytics use case, the models, input data, and results can all be encrypted at rest and have different owners (multi-party); for instance, a hospital could own the patient data and diagnostic results, and a test runner could own the workload model and the Kubernetes cluster. In a build workflow use case, source data is encrypted and can only be delivered to build agents; artifacts can only be decrypted by their corresponding service containers. In a log collection and analysis use case, logs may be encrypted at rest and the platform server 113 can enforce retention and provide an audit trail for accesses. In a fraud collection use case, credit card transaction records may be encrypted individually for processing by third-party fraud detection systems. In a multi-cloud use case, the system 100 can enforce data access controls independent of cloud providers; for instance, data for a workflow composed of steps run in both AWS and AZURE may be protected, as long as clusters in both clouds have included the sidecar.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
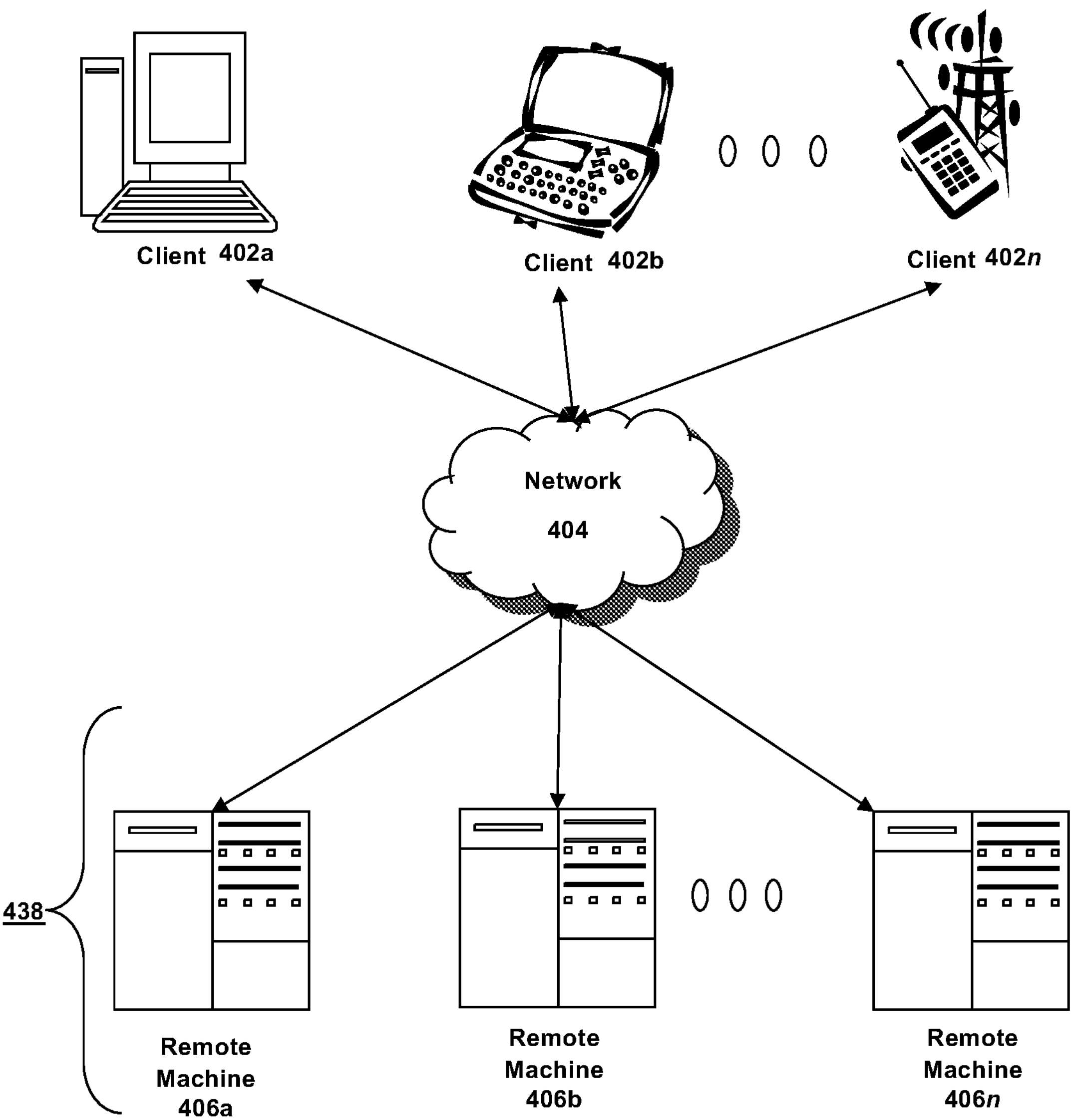
FIGS. 4A-4C are block diagrams depicting embodiments of computers useful in connection with the methods and systems described herein.
Figure 4B:
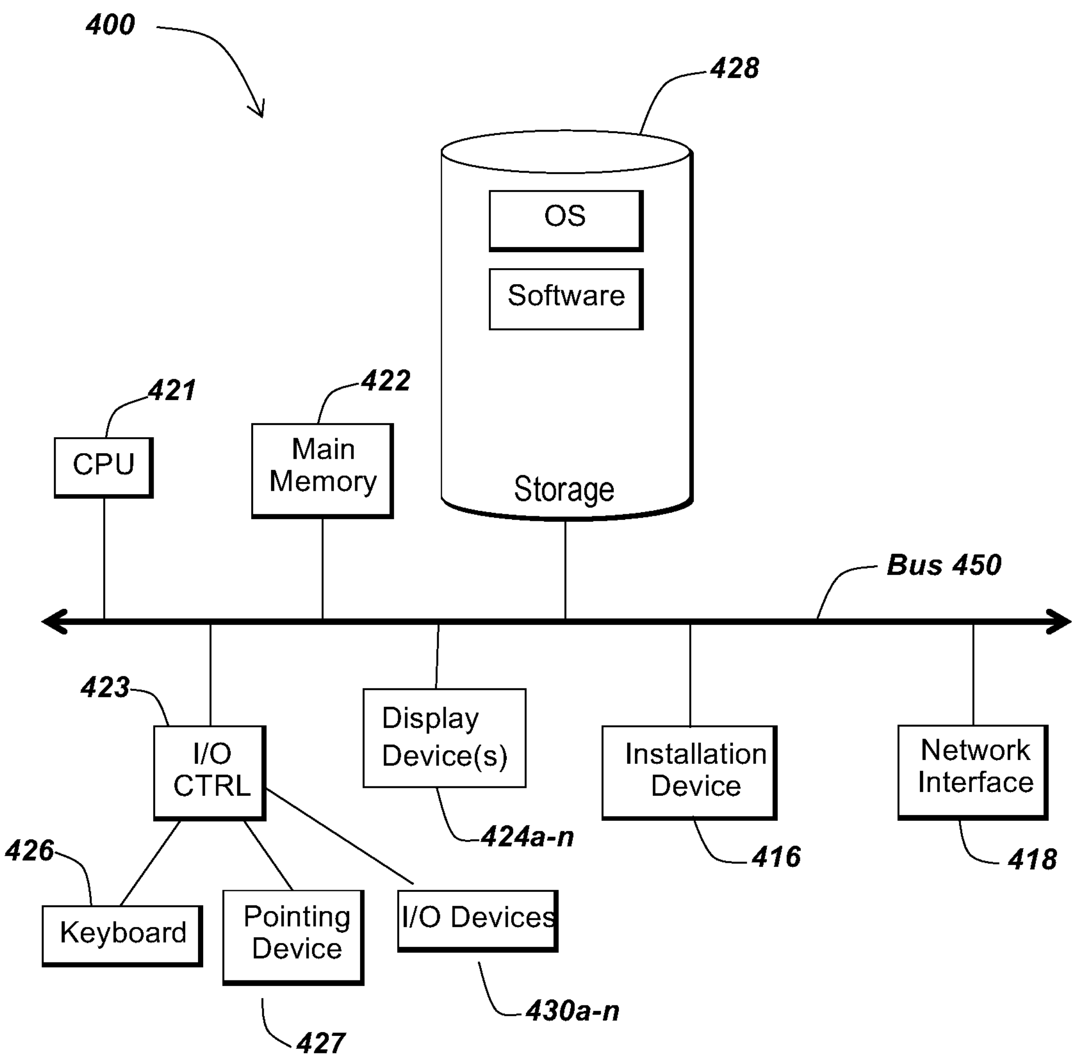
Figure 4C:
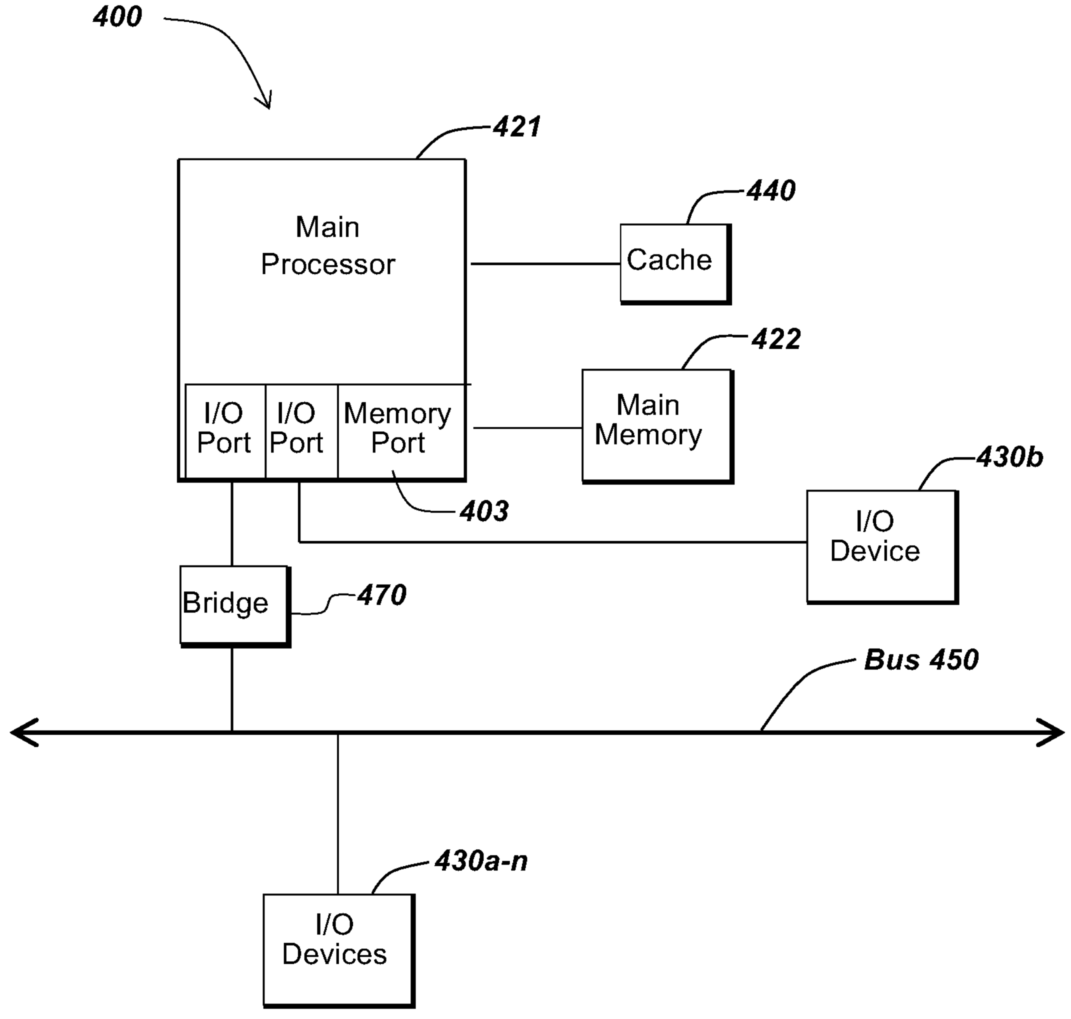

Referring now to FIGS. 4A, 4B, and 4C, block diagrams depict additional detail regarding computing devices that may be modified to execute novel, non-obvious functionality for implementing the methods and systems described above.

Referring now to FIG. 4A, an embodiment of a network environment is depicted. In brief overview, the network environment comprises one or more clients 402*a*-402*n* (also generally referred to as local machine(s) 402, client(s) 402, client node(s) 402, client machine(s) 402, client computer(s) 402, client device(s) 402, computing device(s) 402, endpoint (s) 402, or endpoint node(s) 402) in communication with one or more remote machines 406*a*-406*n* (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 402 and a remote machine 406 (referred to generally as computing devices 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 402.

In one embodiment, a computing device 406 provides functionality of a web server. The web server may be any type of web server, including web servers that are open-source web servers, web servers that execute proprietary software, and cloud-based web servers where a third party hosts the hardware executing the functionality of the web server. In some embodiments, a web server 406 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 406. In one of these embodiments, the logical group of remote machines may be referred to as a server farm 438. In another of these embodiments, the server farm 438 may be administered as a single entity.

FIGS. 4B and 4C depict block diagrams of a computing device 400 useful for practicing an embodiment of the client 402 or a remote machine 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424*a-n*, a keyboard 426, a pointing device 427, such as a mouse, and one or more other I/O devices 430*a-n*. The storage device 428 may include, without limitation, an operating system and software. As shown in FIG. 4C, each computing device 400 may also include additional optional elements, such as a memory port 403, a bridge 470, one or more input/output devices 430*a-n* (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430*b* via, for example, HYPERTRANSPORT, RAPIDIO, or INFINIBAND communications technology.

One or more of a wide variety of I/O devices 430*a-n* may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, CA.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS VISTA, and WINDOWS 10 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; or any type and/or form of a Unix operating system, among others.

Having described certain embodiments of methods and systems for securing data access by containerized applications, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for securing data access by containerized applications, the method comprising:

intercepting, by a first container executing on a first computing device and associated with a containerized application in a second container executing on the first computing device, a first Internet Protocol (IP) request from the containerized application, the request including a request to transmit data to a database associated with a second computing device;

determining, by the first container, that the containerized application is authorized to access the database;

encrypting, by the first container, a payload portion of the first IP request; and transmitting, by the first container, to the database, a second IP request with the encrypted payload portion.

2. The method of claim 1 further comprising:

receiving, by the first container, a first signature associated with the containerized application;

accessing, by the first container, a registry of containerized applications, the registry including a second signature for the containerized application;

determining, by the first container, whether the first signature and the second signature satisfy a threshold level of similarity; and attesting, by the first container, to the database, a level of validity of the containerized application making the first IP request.

3. The method of claim 1 further comprising:

receiving, by the first container, a first signature associated with the containerized application;

accessing, by the first container, a registry of containerized applications, the registry including a second signature for the containerized application;

determining, by the first container, whether the first signature and the second signature satisfy a threshold level of similarity; and attesting, by the first container, to the second computing device, a level of validity of the containerized application making the first IP request.

4. The method of claim 1 further comprising applying, by the first container, a policy to determine to encrypt the payload portion of the first IP request.

5. A method for securing data access by containerized applications, the method comprising:

intercepting, by a proxy within a first container executing on a first computing device and associated with a containerized application in a second container executing on the first computing device, a first Internet Protocol (IP) request from the containerized application, the request including a request to transmit data to a database associated with a second computing device;

determining, by the proxy, that the containerized application is authorized to access the database;

encrypting, by the proxy, a payload portion of the first IP request; and transmitting, by the proxy, to the database, a second IP request with the encrypted payload portion.

6. A system for securing data transmission by containerized applications comprising:

a first computing device executing a first container and a second container, the first container associated with a containerized application in the second container, the first container further comprising:

means for intercepting a first Internet Protocol (IP) request from the containerized application;

means for determining that the first IP request is addressed to a second computing device executing a resource that the containerized application is authorized to access;

means for encrypting a payload portion of the first IP request; and means for transmitting, to the resource, a second IP request with the encrypted payload portion.

7. The system of claim 6 further comprising a platform server in communication with the first computing device, the platform server comprising means for verifying a container signature associated with the first container.

8. The system of claim 6, wherein the first computing device further comprises a touchless infrastructure configured to prevent modification at runtime.

* * * * *